Figure 1:
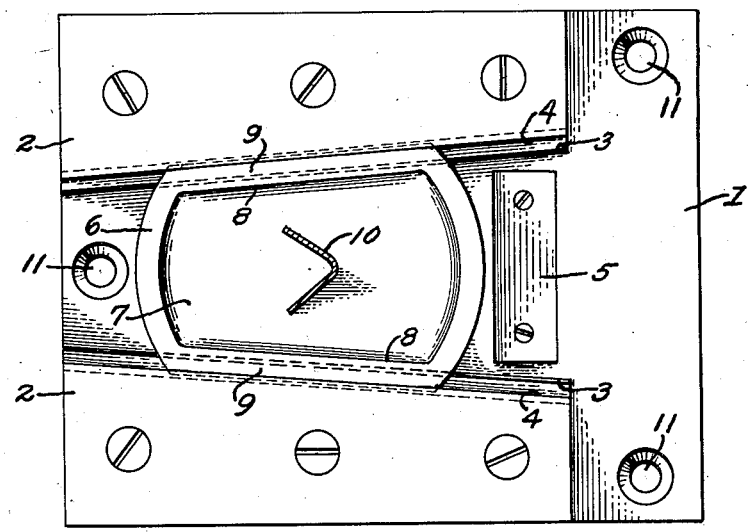
Figure 2:
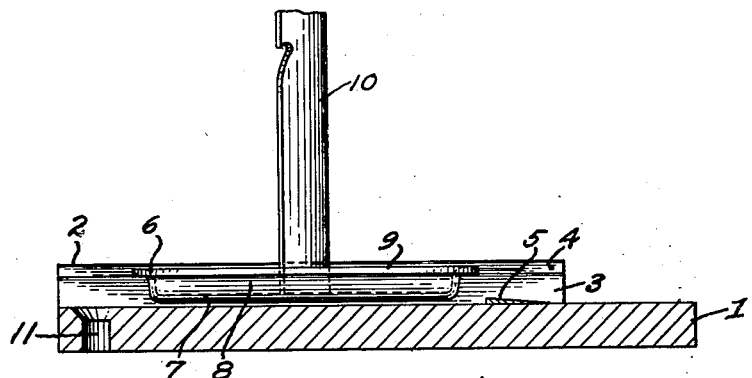
Figure 3:
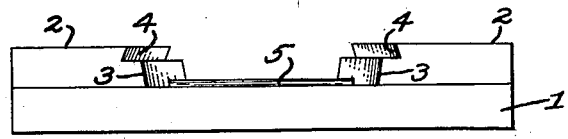

June 29, 1937.  G. E. GAUS  2,085,309

IDENTIFICATION DEVICE

Filed Jan. 28, 1935

INVENTOR
G. E. GAUS

BY  ATTORNEY

Patented June 29, 1937

2,085,309

UNITED STATES PATENT OFFICE 2,085,309

IDENTIFICATION DEVICE

George E. Gaus, Washington, D. C., dedicated to the free use of the Public

Application January 28, 1935, Serial No. 3,815

2 Claims. (Cl. 100—14)

(Granted under the act of March 3, 1883, as amended April 30, 1928; 370 O. G. 757)

This application is made under the act approved March 3, 1883, as amended by the act of April 30, 1928, and the invention herein described may be manufactured and used by or for the Government for governmental purposes without the payment to me of any royalty thereon.

I hereby dedicate the invention herein described to the free use of the public, to take effect upon the granting of a patent to me.

My invention relates to that class of holders employing stationary wedge-like jaws designed to coact in the engagement retention and release of any identification tag assembly, comprising a substantially rigid anchoring means firmly affixed to a tag head having outwardly tapered sides with yielding flange-like tongues formed thereon.

The object of my invention is to provide a reasonably secure retention for the head of the tag assembly when its anchoring means is subjected to moderate lateral draft, yet which will permit the release of the tag head by application of forcible rocking motion to said anchoring means.

In order to carry out the purposes of my invention, reference is to be had to the peculiar combination and arrangement of parts as shown in the accompanying drawing, forming a part of this specification, in which similar numerals refer to similar parts throughout the several views.

Figure I is a plan view of my tag holder illustrating the engagement of a tag head therewith.

Figure II is a section through the center of my tag holder illustrating the method of engagement of the head of the identification tag assembly with my holder, the anchoring means being shown in fragmentary elevation for convenience in illustration.

Figure III is an end view of my tag holder illustrating the slanting cheeks and inwardly dovetailed upper edges of the converging jaws.

Referring to the drawing, bed plate 1 is provided at one end with automatically-tightening wedge-formed jaws 2 adapted to engage tag head 6 of tag assembly 6—10, and also provided near its opposite end with a ramp 5 adapted to guide tag head 6 within the confines of jaws 2.

Tag assembly 6—10 is provided with a wedge-formed tag head 6, comprising base 7, outwardly tapering flanges 8 and yielding rim flanges or tongues 9, said tag head being firmly affixed to a substantially rigid V-form anchoring means 10.

Converging jaws 2 have their respective adjacent cheeks 3 tapered outwardly from the vertical and dovetailed inwardly from the upper edges, forming locking grooves 4.

For the purpose of explanation of the method of operation of my device in connection with an identification tag as covered by U. S. Letters Patent No. 1,922,799, issued August 15, 1933, tag assembly 6—10 as illustrated in the drawing will be discussed.

My invention may be practiced by mounting plate 1, by means of screw holes 11, on the movable or fixed pressing platens of a conventional bale press-box, which position will permit completion of the process of affixing identification tags. The operation of my device will be described when mounted on the movable pressing platen of the conventional bale press-box.

When plate 1 is thus mounted, engagement of tag assembly 6—10 with plate 1 is effected by inserting wedge-formed tag head 6 within the confines of converging jaws 2, having base 7 in contact with guide-ramp 5, thence applying pressure to tag head 6 in the direction of convergence of jaws 2, causing tapered flanges 8 to bear forcibly against tapered cheeks 3, and tongues 9 to be pinched beneath the tapered dovetail walls of locking grooves 4 insuring reasonably secure retention of tag head 6.

At the inception of the process of baling tag head 6 is engaged with jaws 2, the bale covering is forced downwardly on anchoring means 10 and in contact with plate 1. The material to be baled is introduced into the bale press-box and the process of baling is performed in the conventional manner. The customary process of baling effects the envelopment and impaction of tag anchoring means 10 with the material being baled, thereby arresting removal of tag assembly 6—10 from the confines of the baled material.

It will be noted related parts of tag head 6 and jaws 2 are so dimensioned that release of the tag head from my holder may be effected by the application of the forces of vertical pressure and lateral draft to the tag assembly 6—10. Said forces arise in the normal function of baling and then removing a completed bale, having tag assembly 6—10 affixed thereto, from a conventional baling press. Since the depth of tag head 6, taken beneath the underside of tongues 9 is less than the depth of cheeks 3 the vertical pressure exerted upon base 7 during the process of baling causes the tongues 9 to yield inwardly slightly thereby releasing said tongues from the pinching retention of grooves 4. The angular dimensions of the meeting faces of flanges 8 and cheeks 3 permit withdrawal of the released tag head 6 from the confines of jaws 2 by tipping the tag assembly 6—10, affixed to the bale, sideward with the bale by application of forcible lateral draft to a side of the bale, said lateral draft customarily occurring during removal of the completed bale from a conventional press box. Plate 1 remains attached to the baler pressing platen.

It is obvious that minor changes may be made in the details of construction and the arrangement of the parts without departing from the spirit of the invention as set forth in the appended claims.

Having thus described my invention, what I claim for Letters Patent is:

1. An identification device consisting of a tag holder, comprising wedge-formed jaw members having oppositely disposed grooves inwardly dovetailed from the upper edges and contiguous with outwardly tapered converging jaw cheeks, adapted to be interiorly affixed to a pressing platen of a baler, a nail-like identification tag having a yielding head formed with tongue portions for engagement within said grooves and flanged walls of lesser depth than and for engagement with said cheeks, said jaw members adapted to receive laterally and interlock the head of the nail-like identification tag and secure said tag during engagement of the tag with the material to be baled as the same is being formed into a bale, and adapted to ultimately permit the release of the tag from said holder upon completion of the normal process of baling.

2. An identification device consisting of a plate-like tag holder having wedge-formed tightening jaw members and oppositely disposed grooves inwardly dovetailed from the upper edges and contiguous with outwardly tapered converging jaw cheeks, adapted to be interiorly affixed to a pressing platen of a baler, a nail-like identification tag having a yielding head formed with tongue portions for engagement within said grooves and flanged walls of lesser depth than and for engagement with said cheeks, said holder adapted to engage and to retain the head of said identification tag in a plane substantially coincident with one of the outer surfaces of the mass of the material being baled and at a normal to the plane of movement of said material during engagement of said tag with the material, and adapted to ultimately permit the release of the tag head from the holder upon removal of the finished baled material from the baler.

GEORGE E. GAUS.